US009776470B2

(12) United States Patent
Wang et al.

(10) Patent No.: US 9,776,470 B2
(45) Date of Patent: Oct. 3, 2017

(54) UN-PARTITIONED HVAC MODULE CONTROL FOR MULTI-ZONE AND HIGH PERFORMANCE OPERATION

(71) Applicant: MAHLE International GmbH, Stuttgard (DE)

(72) Inventors: Mingyu Wang, Amherst, NY (US); Prasad S. Kadle, Williamsville, NY (US); Jeffrey C. Kinmartin, East Amherst, NY (US); Debashis Ghosh, Williamsville, NY (US); Charles A. Archibald, Lockport, NY (US)

(73) Assignee: MAHLE International GmbH, Stuttgart (DE)

( * ) Notice: Subject to any disclaimer, the term of this patent is extended or adjusted under 35 U.S.C. 154(b) by 719 days.

(21) Appl. No.: 14/282,173

(22) Filed: May 20, 2014

(65) Prior Publication Data
US 2015/0336439 A1   Nov. 26, 2015

(51) Int. Cl.
*B60H 1/00*   (2006.01)

(52) U.S. Cl.
CPC ..... *B60H 1/00864* (2013.01); *B60H 1/00064* (2013.01); *B60H 2001/002* (2013.01); *B60H 2001/00092* (2013.01)

(58) Field of Classification Search
CPC ............ B60H 1/00864; B60H 1/00064; B60H 2001/00092; B60H 2001/002
USPC ........................................................ 701/36
See application file for complete search history.

(56) References Cited

U.S. PATENT DOCUMENTS

| 5,228,475 A | 7/1993 | Trill |
| 5,983,657 A | 11/1999 | Murata et al. |
| 6,368,207 B1 | 4/2002 | McLaughlin et al. |
| 6,547,152 B1 | 4/2003 | Pawlak, III |
| 6,772,833 B2 | 8/2004 | Auer et al. |
| 7,174,918 B2 | 2/2007 | Stevenson et al. |
| 7,832,464 B2 * | 11/2010 | Kinmartin .......... B60H 1/00064 165/202 |
| 2004/0016536 A1 * | 1/2004 | Auer .................. B60H 1/00064 165/203 |
| 2005/0263278 A1 * | 12/2005 | Samukawa ........ B60H 1/00864 165/204 |

* cited by examiner

*Primary Examiner* — Yazan Soofi
(74) *Attorney, Agent, or Firm* — Brinks Gilson & Lione (57) ABSTRACT

An automotive HVAC system includes upper and lower mode cases configured to discharge separate streams of temperature-conditioned air into front and rear passenger zones. The system separates the inlet air into separate mixing chambers, and a third stream through a heater core. Blend doors control hot and cold air streams entering their respective mixing chambers. Operation is controlled by reading requested temperature, blower rate and mode for system zone outlet, converting requests to a flowrate, calculating total flowrate as a summation of all requests, employing a math model to calculate total zonal flowrate as a summation of all zonal flowrates, calculating a blower control error as a function of the difference between total blower request and total zonal flowrate, modifying the operating state using the calculated control error, positioning and resetting the mode valves into defrost, heater and vent openings, and resetting the mode valves.

4 Claims, 9 Drawing Sheets

UN-PARTITIONED HVAC MODULE CONTROL FOR MULTI-ZONE AND HIGH PERFORMANCE OPERATION

TECHNICAL FIELD OF INVENTION

The present invention relates to an HVAC unit for providing temperature control to a vehicle cabin.

BACKGROUND OF THE INVENTION

In an automotive vehicle, limited space is allotted beneath or in front of the instrument panel for the heating, ventilation, and air conditioning (HVAC) system. In vehicles having a single zone system compactly designed to fit within the allotted space, it is sometimes desirable to provide an additional temperature-controlled zone. A system with multiple temperature-controlled zones allows the driver and passenger to have separate controls of the temperature in their respective zone thereby maximizing the comfort of each individual. Extending the zone system even further, i.e., a separate control for the rear seat region, may also be desirable.

Single zone systems are generally designed to optimally utilize the amount of available space in a given type of vehicle as well as to conform to the shape of that space. When a dual zone system is designed, it generally must conform to the same size and shape, thereby requiring additional functions to be added without utilizing any extra space. Moreover, when a dual zone system is provided for a particular vehicle line, it is often desired to offer to customers the option of a less expensive single zone system as well. However, the designing and tooling of different systems is sometimes prohibitive for some vehicle models.

HVAC modules produced for use in vehicles typically provide temperature control either to a single zone or to dual zones, i.e., the entire HVAC module is dedicated to one or the other. HVAC modules that have the capability of providing temperature control for an additional zone are specifically designed, tooled and manufactured for the exact number of zones. The production volume (or number of vehicles) for multiple zone modules is typically much lower than that for single or dual zone modules. As such, it is much more expensive to design such a multiple zone module for so few vehicles. Additionally, it would be disruptive to the manufacturing cell and the manufacturing process in general to be forced to build an entirely different HVAC module to achieve an additional temperature-controlled zone.

The HVAC units of the prior art provide for multiple, separate streams of temperature-conditioned air being fed to multiple zones. U.S. Pat. No. 7,832,464 B2 to Kinmartin, et al. provides for an independent mixing valve sub-assembly which includes a casing defining a cold bias inlet, a hot bias inlet and a second zone inlet and a mechanism attaching the casing to the housing of a HVAC module, with the cold bias inlet, the hot bias inlet and the second zone inlet of the mixing valve sub-assembly in sealed engagement with a cold bias outlet, a hot bias outlet and a second zone outlet of a HVAC module, respectively. The mixing valve sub-assembly may provide one or more streams of temperature-controlled air. Accordingly, different mixing valve sub-assemblies may be attached to one universal HVAC module to provide varying numbers of temperature zones.

The HVAC units of the prior art provide for multiple, separate streams of temperature-conditioned air being fed to multiple zones. U.S. Pat. No. 6,772,833 B2 to Auer, et al. provides for an HVAC unit including an evaporator, a heater core, a blower, a plurality of blending chambers and an insert mounted within the housing. The insert controls the flow of conditioned air from the blending chambers thus providing multiple separate streams of temperature-conditioned air to multiple zones.

U.S. Pat. Nos. 6,772,833 B2 and 7,832,464 B2 are hereby incorporated herein in their entirety.

Although the prior art provides for an HVAC unit capable of producing multiple temperature-controlled streams of air to be fed to multiple vehicle zones, a different HVAC unit must be designed and tooled for each discrete number of temperature-controlled streams, i.e., an entirely different HVAC unit for each number of independently temperature-controlled streams for different zones.

Traditional heating, ventilation and air conditioning (HVAC) modules use partition walls extending up to the evaporator in the HVAC module to provide multiple streams of conditioned airflow. These multiple streams of airflow are used to achieve multi-zone climate control in the associated vehicle passenger compartment. Dual-zone or tri-zone climate control systems based upon this type of HVAC module are frequently employed in modern passenger vehicles. Due to operating capacity and packaging constraints, two separate and partitioned HVAC modules are occasionally employed in large vehicles, such as suburban utility vehicles (SUV) and mini-vans, to achieve multi-zone operation, where one module is installed in the area of the vehicle dash and another in the area of the trunk.

However, implementation of the traditional, partitioned, dual HVAC module approach is problematic. For example, they can require excessive packaging space in the host vehicle, more air ducts, more lines and fittings, more refrigerant (typically about 2 extra lbs.), more coolant, more mass, higher operating noise levels, higher cost and increased system complexity that often translates into elevated quality and warranty issues. Such systems require more energy and larger supporting components such as compressors, water pump, condenser, alternator, line sets and ducts. As a consequence, the dual module approach results in increased vehicle fuel consumption and increased exhaust emissions. All of these items significantly contribute to overall vehicle cost and operating costs.

BRIEF DESCRIPTION OF THE INVENTION

The present invention pertains to a high performance HVAC module with enough capacity to replace dual modules presently employed within large vehicle climate control systems. By taking advantage of advances in the art of HVAC design, such as brushless motor architecture, low pressure drop heat exchanger components, and refined scroll design, a single front module is able to provide the total required airflow for air conditioning of a large SUV or mini-van. One HVAC module embodying the present invention provides 520 cubic feet per minute (CFM) airflow at 13 volts (VDC) in outside-air (OSA) mode.

According to one aspect of the invention, a HVAC system for a passenger vehicle includes a single housing assembly encasing an air conditioning evaporator and a heater core, an upper mode case configured to discharge a first stream of temperature-conditioned air into a front passenger zone through one or more zone outlets, and a lower mode case configured to discharge a second stream of temperature-conditioned air into a rear passenger zone through one or more zone outlets. The housing assembly directs system inlet air through the evaporator and thereafter trifurcates the inlet air into a first cold air stream directed into a first mixing chamber disposed in said upper mode case, a second cold air stream directed into a second mixing chamber disposed in said lower mode case, and a third stream directed through said heater core. An upper temperature blend door is operable to control the mix of a first hot air stream exiting said heater core with the first cold air stream as they enter the first mixing chamber, and a lower temperature blend door is operable to control the mix of a second hot air stream exiting said heater core with the second cold air stream as they enter said second mixing chamber.

According to another aspect of the invention, an HVAC control system comprising a driver circuit operative to selectively independently position each temperature blend door and each zone mode valve. The control system further comprises a microprocessor based HVAC module mathematic model software operative to receive operator selected discharge temperature, discharge flow rate and discharge mode inputs for each outlet and to generate a separate drive control signal for each as a function thereof. This arrangement provides autonomous delivery of temperature-conditioned air to a front passenger zone and to a rear passenger zone in which front passengers are unaffected by control setting changes effected by rear passengers and vice versa.

According to yet another aspect of the invention, a method of controlling the discharge of temperature-conditioned air into front and rear automobile passenger zones comprising the steps of reading operator requested discharge temperature, discharge blower rate and discharge mode inputs for each automotive heating, ventilating and air conditioning system zone outlet, converting each discharge blower request to a requested zonal flowrate, calculating a total requested flowrate as a summation of all zonal flowrate requests calculating zonal flowrates employing a predetermined math model, calculating a total flowrate as a summation of all zonal flowrates, calculating a total blower control error as a function of the difference between said total blower request and said total calculated flowrate, calculating a zone blower control error as a function of the difference between said total blower request and said zonal flowrate, modify the effective flow areas of said mode valves, distributing the effective flow areas of said mode valves into defrost, heater and vent openings and resetting said mode valves as a function of said modification and distribution. This arrangement provides autonomous delivery of temperature-conditioned air to a front passenger zone and to a rear passenger zone in which front passengers are unaffected by control setting changes effected by rear passengers and vice versa.

These and other features and advantages of this invention will become apparent upon reading the following specification, which, along with the drawings, describes preferred and alternative embodiments of the invention in detail.

BRIEF DESCRIPTION OF DRAWINGS

This invention will be further described, by way of example, with reference to the accompanying drawings in which.

Although the drawings represent embodiments of the present invention, the drawings are not necessarily to scale and certain features may be exaggerated in order to illustrate and explain the present invention. The exemplification set forth herein illustrates an embodiment of the invention, in one form, and such exemplifications are not to be construed as limiting the scope of the invention in any manner.

DETAILED DESCRIPTION OF INVENTION

Figure 1:
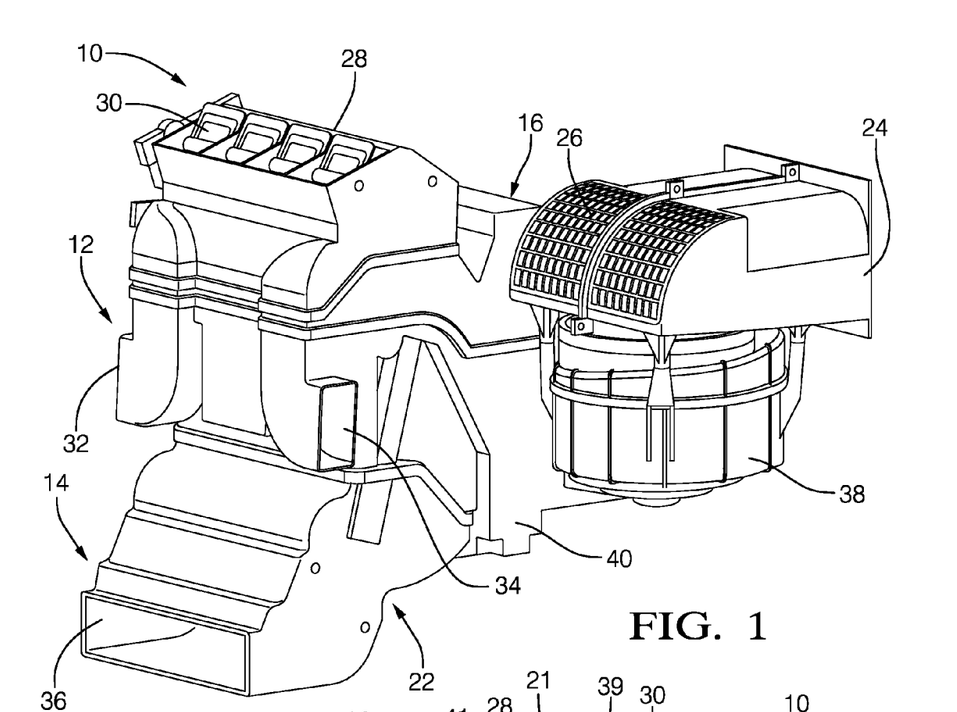
FIG. 1, illustrates a perspective view of a high performance HVAC module with enough capacity to replace dual modules presently employed within large vehicle climate control systems.

Referring to FIG. 1, the present invention pertains to a high performance HVAC module with enough capacity to replace dual modules presently employed within large vehicle climate control systems. By taking advantage of advances in the art of HVAC module design, such as brushless motor architecture, low pressure drop heat exchanger components, and refined scroll fan design, a single front module is able to provide the total required airflow for air conditioning of a large SUV or mini-van. The depicted HVAC module embodying of the present invention can provide 520 cubic feet per minute (CFM) airflow at 13 volts (VDC) in outside-air (OSA).

Figure 2:
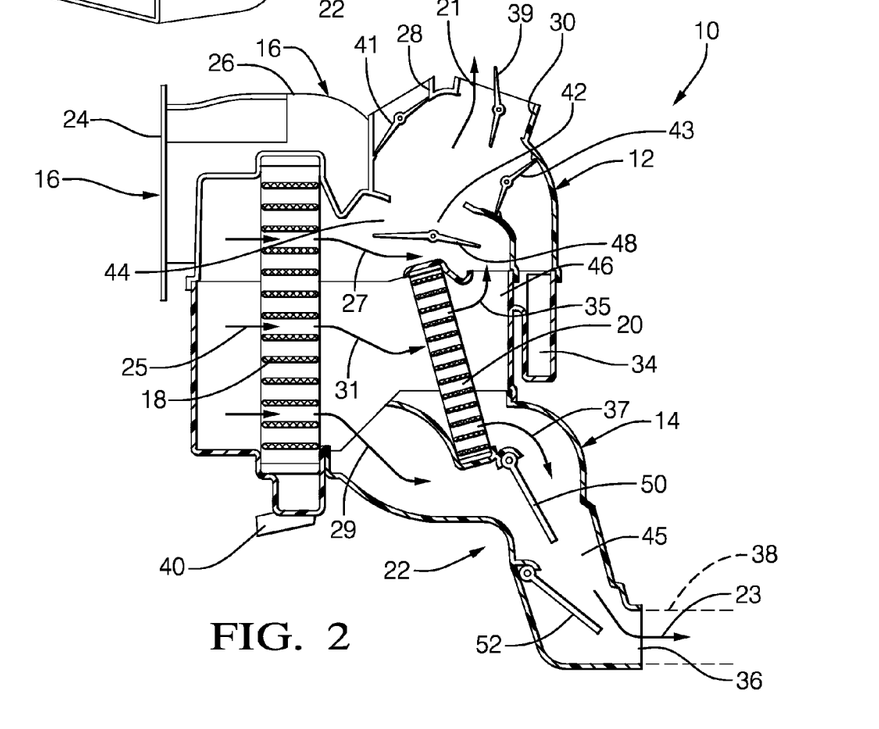
FIG. 2, illustrates a cross-sectional view of the high performance HVAC module of FIG. 1 which is modified to include separate front mode and rear mode cases, depicting internal details thereof.

Referring to FIGS. 1 and 2, an HVAC module 10 includes an upper mode case 12 and a lower mode case 14. The HVAC module 10 has a housing assembly 16, an evaporator 18 and a heater core 20. The housing assembly 16 defines a primary inlet 24 for selective intake of outside air, a secondary inlet 26 for selective intake of recirculated cabin air, a first zone outlet 28 for conveying defrost air, a second zone outlet 30 for conveying upper cabin air to a driver and/or front cabin occupant, a third zone outlet 32 for conveying mid-level and/or lower cabin air to the left front cabin occupant (driver), a forth zone outlet 34 for conveying mid-level and/or lower cabin air to the right front cabin occupant, and a fifth zone outlet 36 for conveying left and/or right side rear cabin air to rear seat occupants. As illustrated in phantom in FIG. 2, a longitudinally extending duct 38 communicates the fifth zone outlet 36 into the rear passenger compartment (not illustrated).

The upper mode case 12 forms a first mixing chamber 42, the first zone outlet 28, which is selectively restricted or closed by a first mode valve 41 (illustrated as fully closed), the second zone outlet 30, which is selectively restricted or closed by a second mode valve 39 (illustrated as fully open), the third zone outlet 32 (illustrated in FIG. 1) which is selectively restricted or closed by a third mode valve (not illustrated), and the forth zone outlet 34 which is selectively restricted or closed by a fourth mode valve 43 (illustrated as fully closed). A temperature valve/blend door 48 selectively controls a first cold air stream 27 flowing through a cold air path 44 and a hot air stream 35 flowing through a hot air path 46 conjoining at the temperature valve/blend door 48 and flowing into the mixing chamber 42.

The lower mode case 14 forms a second mixing chamber 45 and the fifth zone outlet 36, which is selectively restricted or closed by a fifth mode valve 52 (illustrated as partially open). A temperature valve/blend door 50 selectively controls a second cold air stream 29 and a second hot air stream 37 flowing into the second mixing chamber 45. A third cold air stream 31 flows through heater core 20, and is transformed into first and second heated air flows 35 and 37. An inlet air flow 25 passes through the evaporator 18 and is trifurcated into separate cold air streams 27, 29 and 31.

A fan assembly 38 disposed within the housing assembly 16 selectively drives air from the primary/secondary inlets 24, 26 to the first through fifth zone outlets 28, 30, 32, 34 and 36, respectively. The evaporator 18 is supported by the housing 16 and is disposed downstream of the primary inlet 24. The evaporator 18 cools the air entering from one of the inlets 24, 26. A cold bias outlet 40 is defined by the housing 16.

The heater core 20 is supported by the housing 16 and is disposed downstream of the evaporator 18. The heater core 20 heats the cool air being delivered from the evaporator 18. A hot bias outlet (not illustrated) is defined by the housing 16. The housing 16 defines a mixing chamber 42 and a cool air path 44. The cool air path 44 conveys the cool air stream 27 from the evaporator 18 to the mixing chamber 42. Additionally, the housing 16 defines a heated air path 46 parallel to the cool air path 44. The heated air path 46 conveys air from the heater core 20 to the mixing chambers 42 and 45. The mixing chamber 42 receives and mixes cool air from the evaporator 18 and the hot air from the heater core 20. A temperature valve 48 is disposed between the heated air path 46 and the cool air path 44 for apportioning the flow of cool air originating in the evaporator 18 between the cool air path 44 (for airflow into the mixing chamber 42) and the heated air path 46 (for airflow through the heater core 28) then into the mixing chamber 42. A rear zone temperature valve 50 is disposed downstream of the heater core 20 to apportion airflow in the lower mode case 14 from the cool air path 29 and heated air path 37 to the fifth zone outlet 36. A rear zone valve 52 serves to restrict and/or shut off all airflow in the lower mode case 14 through the fifth zone outlet 36 and duct 38 leading to the rear passenger compartment.

One of the key design features of the High Performance Module is that it offers common cold and hot air stream access to the individual zones. Downstream of the evaporator and heater, there is no partition wall for forming multi-zone air streams. The airflow from the evaporator and the heater is open to all zonal air streams. The zonal air streams take on their own flow and temperature characteristics starting from a mixing zone downstream of the heater and evaporator, whereby partition walls are used to separate the airflows into distinct zones.

The high performance module 10 employs applicant's "Flexzone" architecture. In this construction, the front zone airflows and the rear zone airflows are formed separately with the "Upper Mode Case" 12 and the "Lower Mode Case" 14 as depicted in FIG. 2. The upper case 12 is designed to provide the airflow streams to the front two zones in the passenger compartment and the lower case 14 is designed to provide air streams to the rear two zones in the vehicle, either in the form of left/right rear zones or second/third row rear zones. As described previously, both of these cases 12, 14 share common airflow access from the heater 20 and the evaporator 18.

The benefit of "Open Airflow Access" is that each zone has full access to the entire airflow through the evaporator 18 and also the entire hot airflow through the heater 20. It is thus possible to provide "Super HVAC Module" operation with the full power of the HVAC module 10. However, this also represents a shortcoming of the Flexzone architecture: that airflow control changes from any zone can alter the airflow and possible temperature characteristics of all the other zones, causing airflow and temperature controllability issues.

The present invention provides a control method to enable independent zonal control whereby passengers located in each zone of the passenger compartment can obtain and maintain the desired airflow regardless of the operations by passengers in the other zones. It essentially disentangles the coupling of discharge airflow between zones due to the module architecture.

Airflow Control System Based on Velocity Sensors

Figure 3:
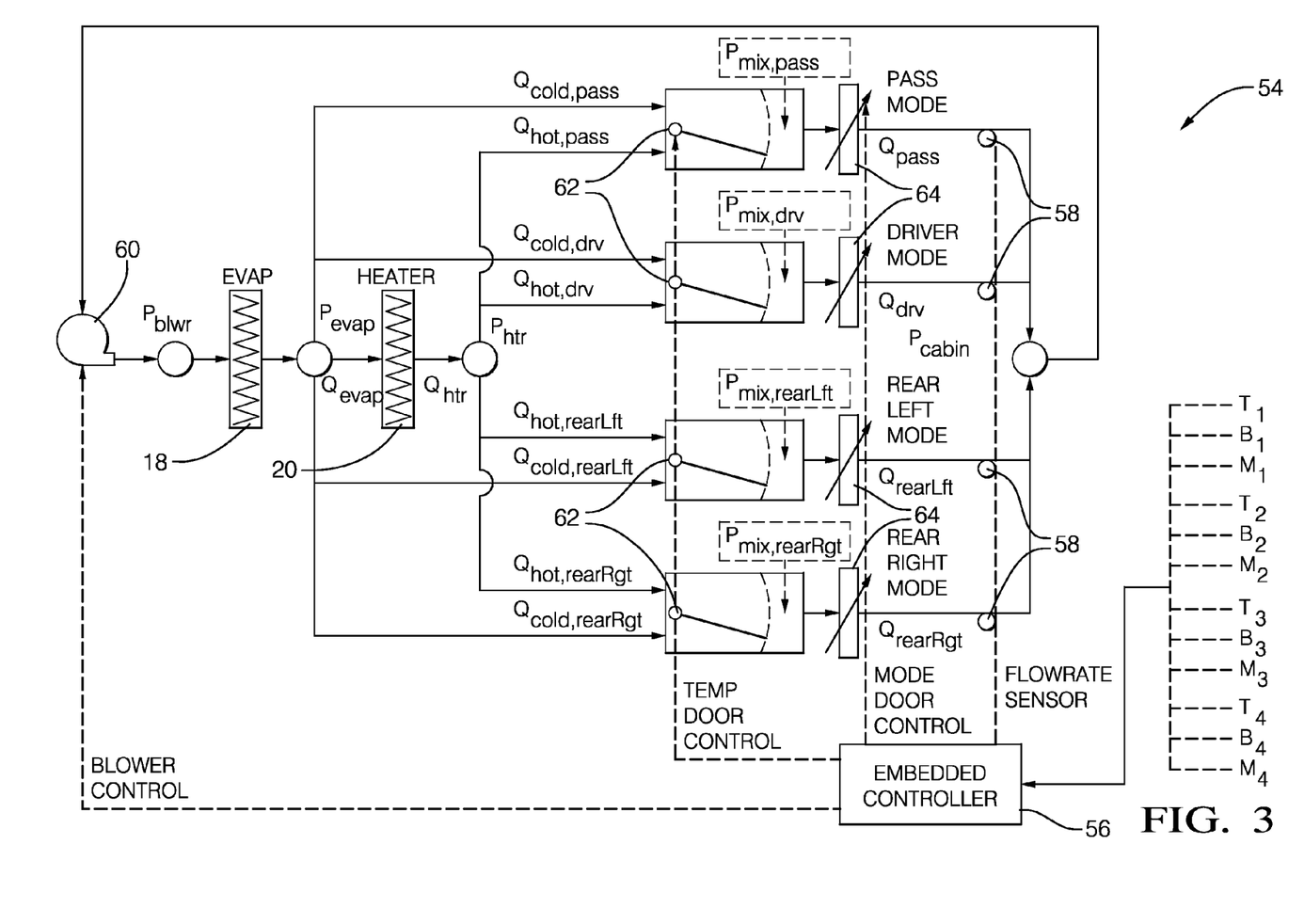
FIG. 3, illustrates a HVAC control circuit employing flow rate sensing.

Referring to FIG. 3, one embodiment of the present invention includes a HVAC control system 54 for a vehicle with a High Performance Module capable of supplying conditioned airflow streams for a quad-zone passenger compartment. (The principles embodied are applicable to any multi-zone air conditioning system.) An embedded microcontroller 56 monitors the user inputs in terms of discharge temperature, discharge flow rate, and discharge mode from all four zones. In addition, it also monitors flow rate sensors 58 from each zone as a feedback. The outputs from the microcontroller 56 modulate the operating state of the blower 60, positions of the temperature mix doors 62, and the discharge mode valves 64.

It is to be noted that as part of the mode control, two requirements must be met by the mode valves 64: (1) it is expected that in response to a positional command from the microcontroller 56 (such as an index indicating defrost, defog, heater, bi-level, vent, etc.), the mode control valves 56 are capable of providing the required airflow ratios to the defrost, heater, and vent outlets; (2) that it must have the capability to change the total effective flow area while guaranteeing the flow ratio requirements as set forth in (1). When the effective flow area is changed from zero to a pre-determined maximum area, the flow resistance of the path is changed to facilitate overall airflow balance for the vehicle.

Figure 4:
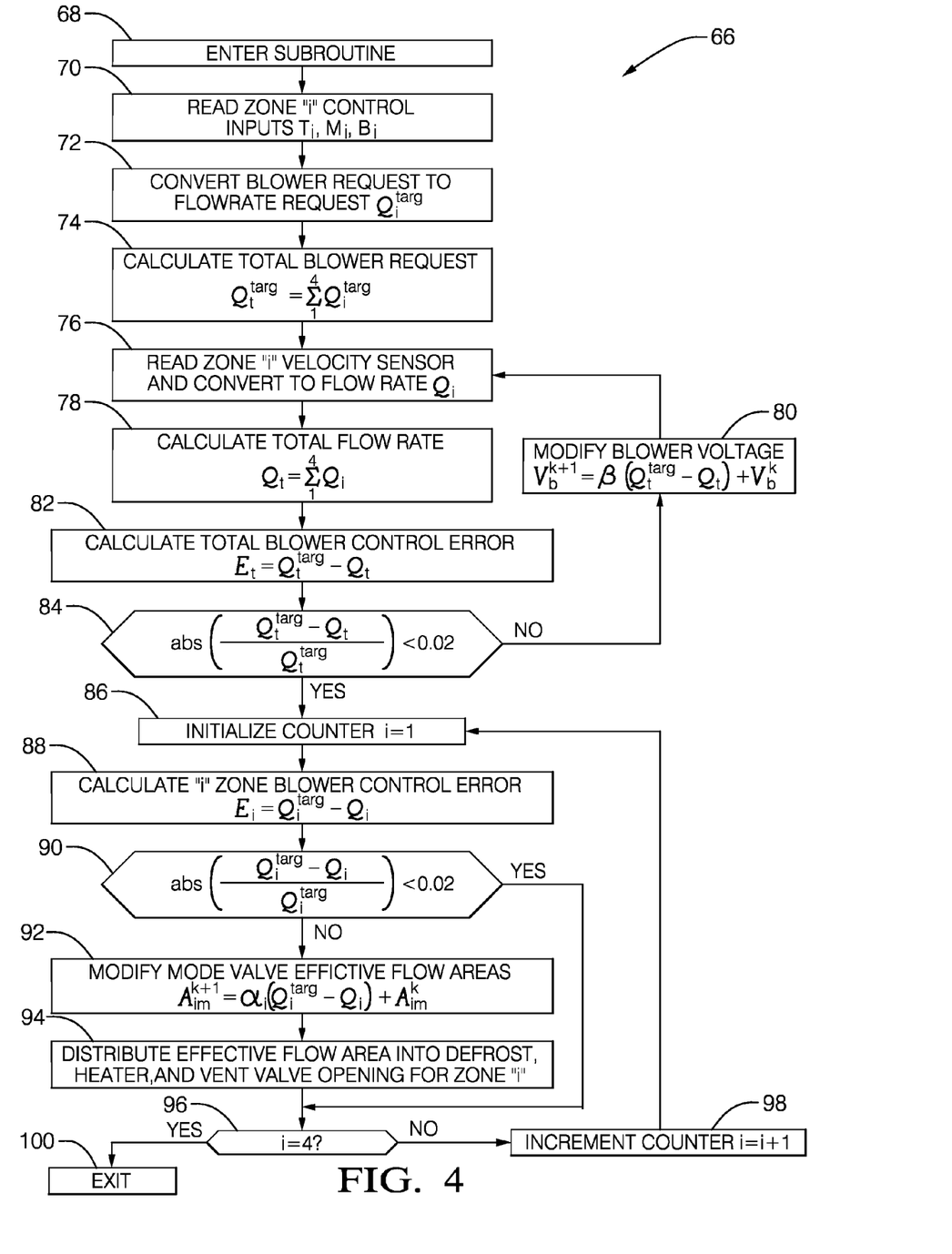
FIG. 4, is a flow chart illustrating the implementation of a zonal airflow balance algorithm of the system defined in FIG. 3.

FIG. 4 illustrates the control algorithm flowchart for the system of FIG. 3. The algorithm of FIG. 4 is contained in an iteration loop executed with pre-determined frequency such as every 0.1, 0.5 or 1.0 second depending on the capability of the microcontroller and the control response requirements. Upon entering the subroutine at step 68, the control targets are read in from each of the Human Machine Interface (HMI) units, commonly known as faceplate for each control zone of the passenger compartment at step 70. For the control of the system defined in FIG. 3, the key inputs are the zonal blower setting requirements (or flow rate requirements) and the mode setting requirements. Due to the feedback provided by the flow rate sensors, the inputs for the discharge temperature are not essential for the effective balance of the airflows except that they are translated into mix door positions which are directly executed by the microcontroller.

The blower setting requirements are subsequently converted into flow rate requirements for the different zones at step 72. Some zones may have higher airflow requirements than others, while other zones may require the airflow to be entirely shut off. These different requirements are embodied by the converted airflow rate targets for the corresponding zones. An additional, total airflow target is generated by summation of the zonal airflow targets in preparation for the actual blower control at step 74.

Subsequently, the air flow rate sensors are read at step 76. These sensors provide live feedback of the airflow in each of the control zones. It is expected that the flow rate sensor can be based on any of the commonly used air velocity sensors, such as hot-wire anemometers or thermistors. Regardless, the signals from the sensors are converted into airflow rate.

The blower control is performed based on the total airflow requirements from the HMI and the actually delivered airflow rate by summation of the converted flow rate sensor readings at step 78. Adjustment to the blower control, such as the blower voltage for direct current (DC) motors and pulse width modulation (PWM) duty cycles for brushless motors, is made by using proportional-integral-derivative (PID) control or its simpler form Proportional Control at step 80. The PID control input is the error between the total airflow targets and the total airflow delivered. This adjustment is made upon each entrance into the control subroutine at step 82.

Subsequent to the blower control adjustment, the zonal airflow balance instructions are executed. In this part of the control, an individual zonal airflow control target from the HMI is compared with actual airflow rate converted from its airflow sensor at step 84 to form the input to the second tier PID control. The process variable controlled is the total effective flow area for the zone as formed jointly by the opening of the mode valves. The total effective flow area may also be modified by a dedicated choke valve in series with the mode valves depending on the HVAC module architecture.

In this two-step process described in steps 86, 88, 90, 92, 94, 96, 98 and 100, each time the subroutine is executed, the blower operating level is changed and the airflow is re-balanced among the four zones. If one zone has a blower setting change, subsequent execution of the subroutine will make adjustment to the process control variables to ensure the new target is met for the changed zone and maintain the airflow for the unchanged zones.

Airflow Control System Based on HVAC Module Math Model

Figure 5:
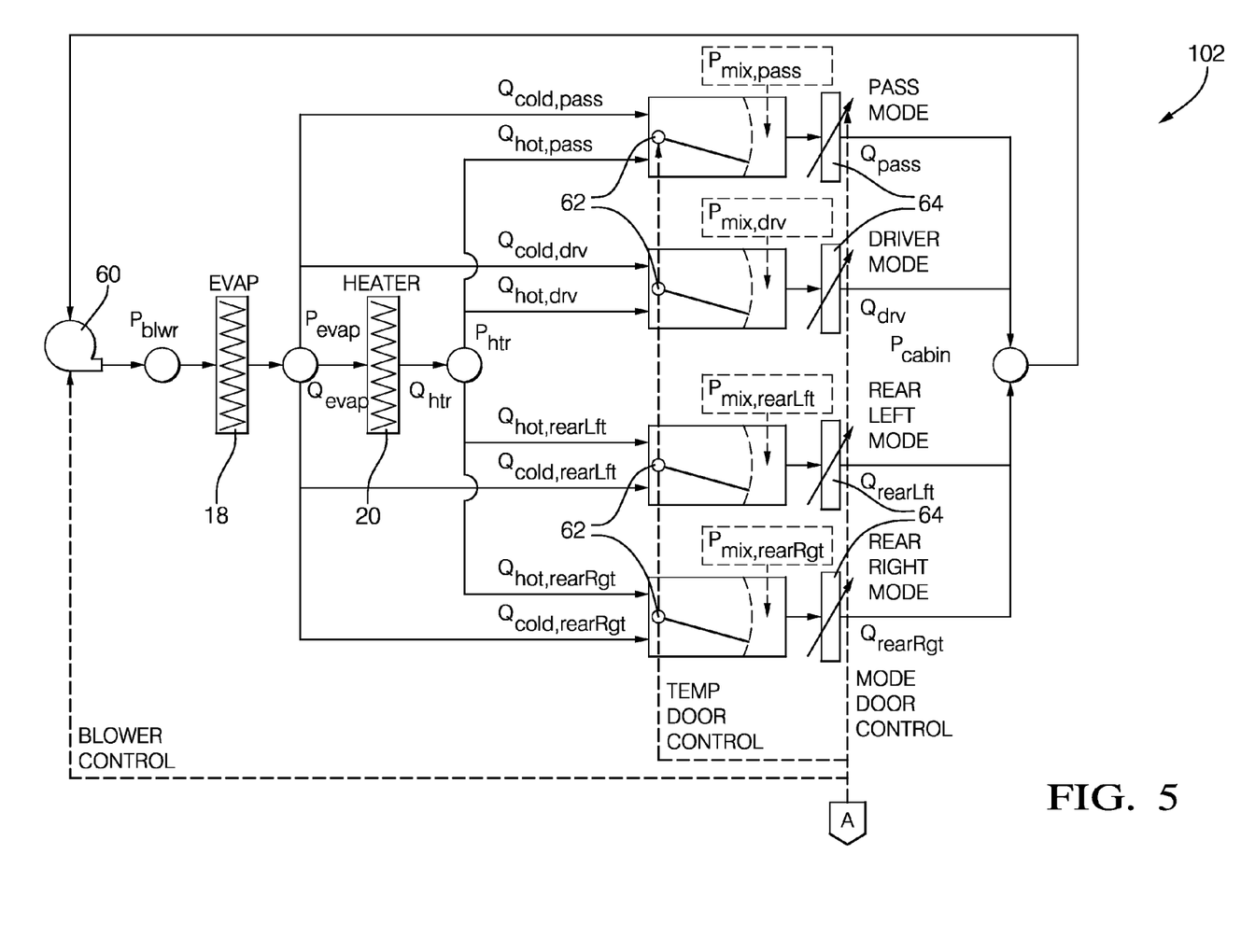
FIGS. 5 and 6, illustrate a HVAC control circuit with an embedded controller providing airflow balance with a HVAC math model.
Figure 6:
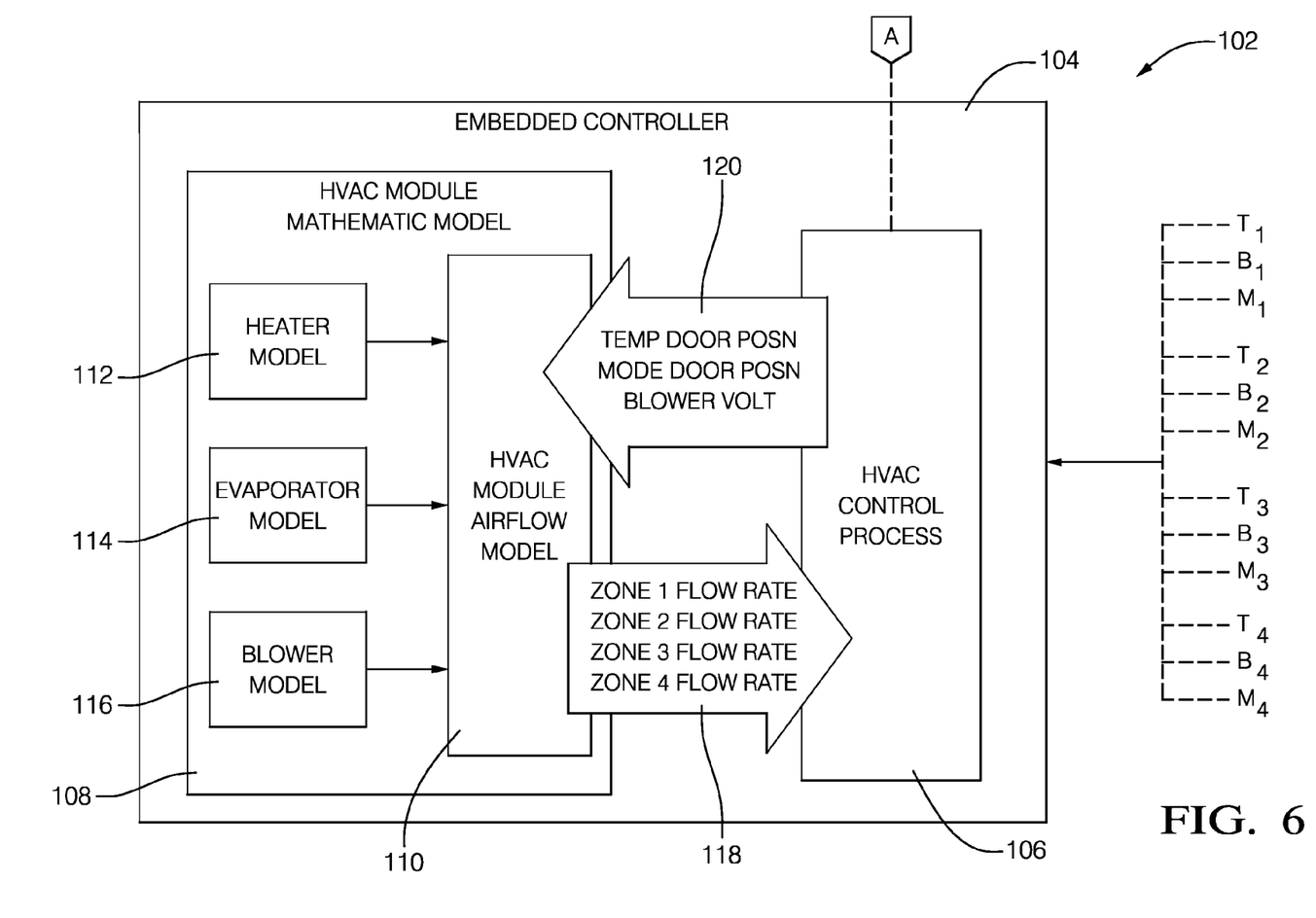

Embodiment 1, as described above, depends on the airflow sensors to provide airflow feedback from each zone. In Embodiment 2 of the present invention, we use a mathematical model of the HVAC module to replace the airflow sensors and provide feedback to the control algorithm. As shown in FIGS. 5 and 6, the sensor hardware has been removed from the HVAC module 102 and an HVAC Module mathematic model is incorporated as part of the microcontroller program 104.

The microcontroller 104 monitors the user inputs in terms of discharge temperature, discharge flow rate, and discharge mode from all four zones. The embedded microcontroller 104 includes a HVAC process module 106 and a HVAC mathematic module 108. The HVAC mathematic module 108 includes an HVAC module airflow module 110 fed by a heater module 112, an evaporator module 114 and a blower module 116. The HVAC mathematic module 108 includes feeds 118 of the various zone flow rates to the HVAC process module 106 which, in turn, includes temperature door position, mode door position and blower voltage feeds 120 to the an HVAC module airflow module 110.

It can be seen that the microcontroller 104 executes at least two functional blocks of programming, with the two blocks interacting and exchanging information with each other. The HVAC control process algorithm, essentially defined in FIG. 4 with major modification (FIG. 7), processes the HMI user inputs, forwards the information onto the HVAC Module Mathematic Model 110, receives the calculated HVAC airflow rates for each zone of the passenger compartment from the Math model, and takes control actions by commanding the HVAC blower and mode valve effective area with operating parameters.

The HVAC Module Mathematical Model 110, on the other hand, provides zonal airflow estimates at any given blower voltage (or PWM duty cycle), mode valve positions, and mix door (aka temperature door) positions. The essential elements of the HVAC model should include a heater model 112, an evaporator model 114, a blower model 116, and a HVAC module airflow model 110 comprehending the mix door positioning and mode door positioning. The output from the HVAC Module Mathematic Model 108 includes at least the airflow rates for each of the climate control zones. It can further be enabled to provide discharge temperatures for each discharge zone. The calculated quantities are sent back to the "HVAC Control Process" 106.

Figure 7:
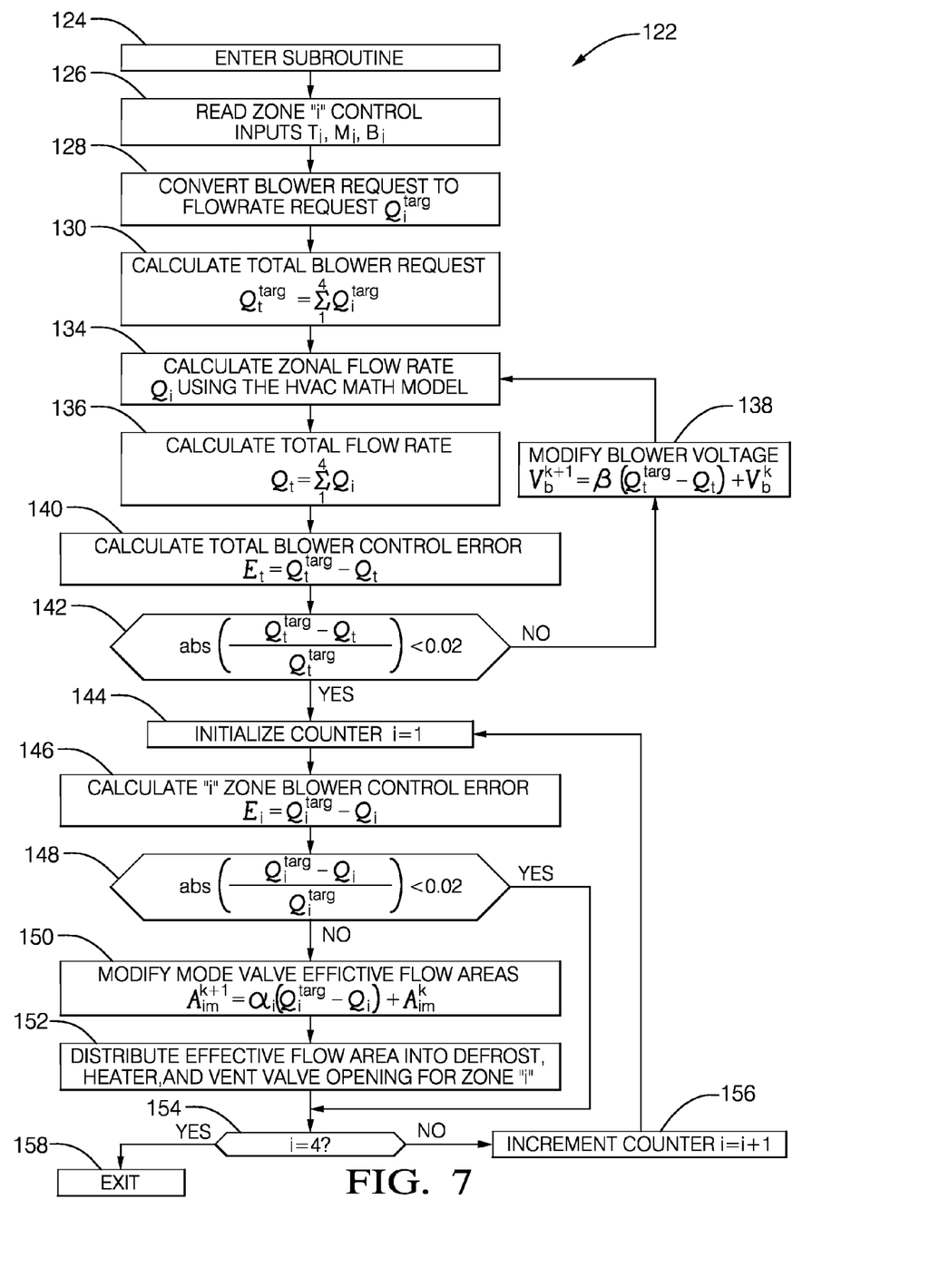
FIG. 7, is a flow chart illustrating the implementation of a modified control algorithm with a HVAC module math mode defined in FIGS. 5 and 6.

Referring to FIG. 7, an alternative control algorithm 122 containing steps 124-158 which are substantially similar to corresponding steps 68-100 of algorithm 66 illustrated in FIG. 4, with the exception of step 134. In step 134 of algorithm 122, zonal flow rate $Q_i$ is calculated using the HVAC math model, contrasted with step 76 of algorithm 66 wherein zone "i" velocity sensor is read and converted to flow rate $Q_i$.

To those skilled in the art of automotive air conditioning systems, various methods of modeling the HVAC model may be realized.

In-Vehicle Adaptive Correction of HVAC Module Math Model

It is known that the performance of the HVAC module changes over the life of the vehicle due to accumulation of dust particles in the air filter and over other components in the path of airflow, such as the heat exchangers, blower blades, plastic airflow ducts, and the like, or due to blower motor performance degradation. The HVAC module mathematic model, on the other hand, is not aware of the physical changes that take place in the HVAC module. The predictive capability of the HVAC mathematic model deteriorates over time. A direct consequence is that the requested airflow from the passengers will not be realized.

Figure 8:
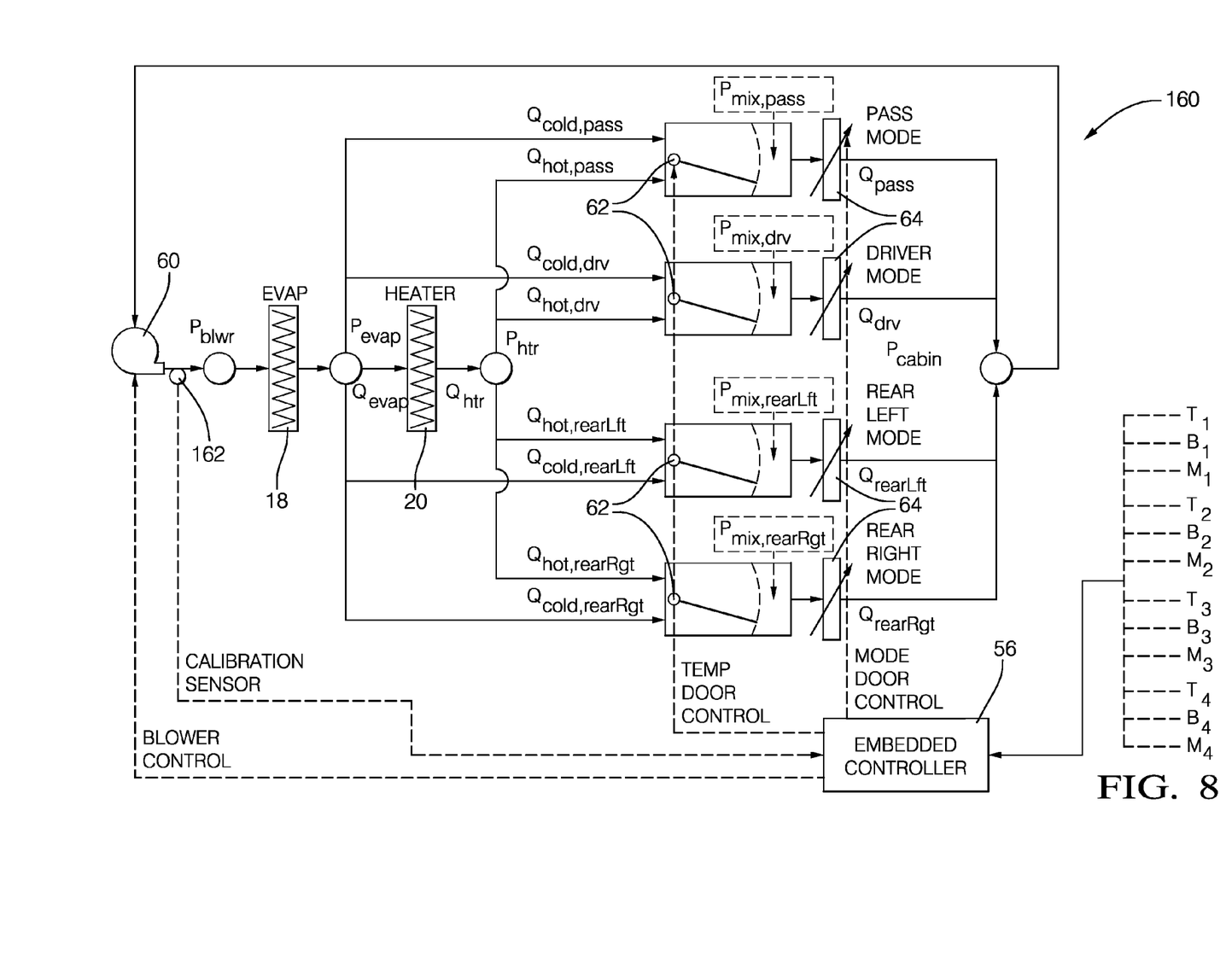
FIG. 8, illustrates a HVAC module math model calibration sensor employing, by way of example, a single air velocity sensor installed before the evaporator and after the blower.

The present invention provides for a method 160 for the correction of the HVAC module mathematic model by way of a dedicated velocity sensor in a selected location in the HVAC module 10. FIG. 8 shows by way of example a single air velocity sensor 162 installed before the evaporator 18 and after the blower 60. The installation location of the sensor can be easily modified by those skilled in the art to various other locations in the airflow path of a HVAC module and ducts. The number of velocity sensors may be one or more, with the latter installed in FIG. 3.

Figure 9:
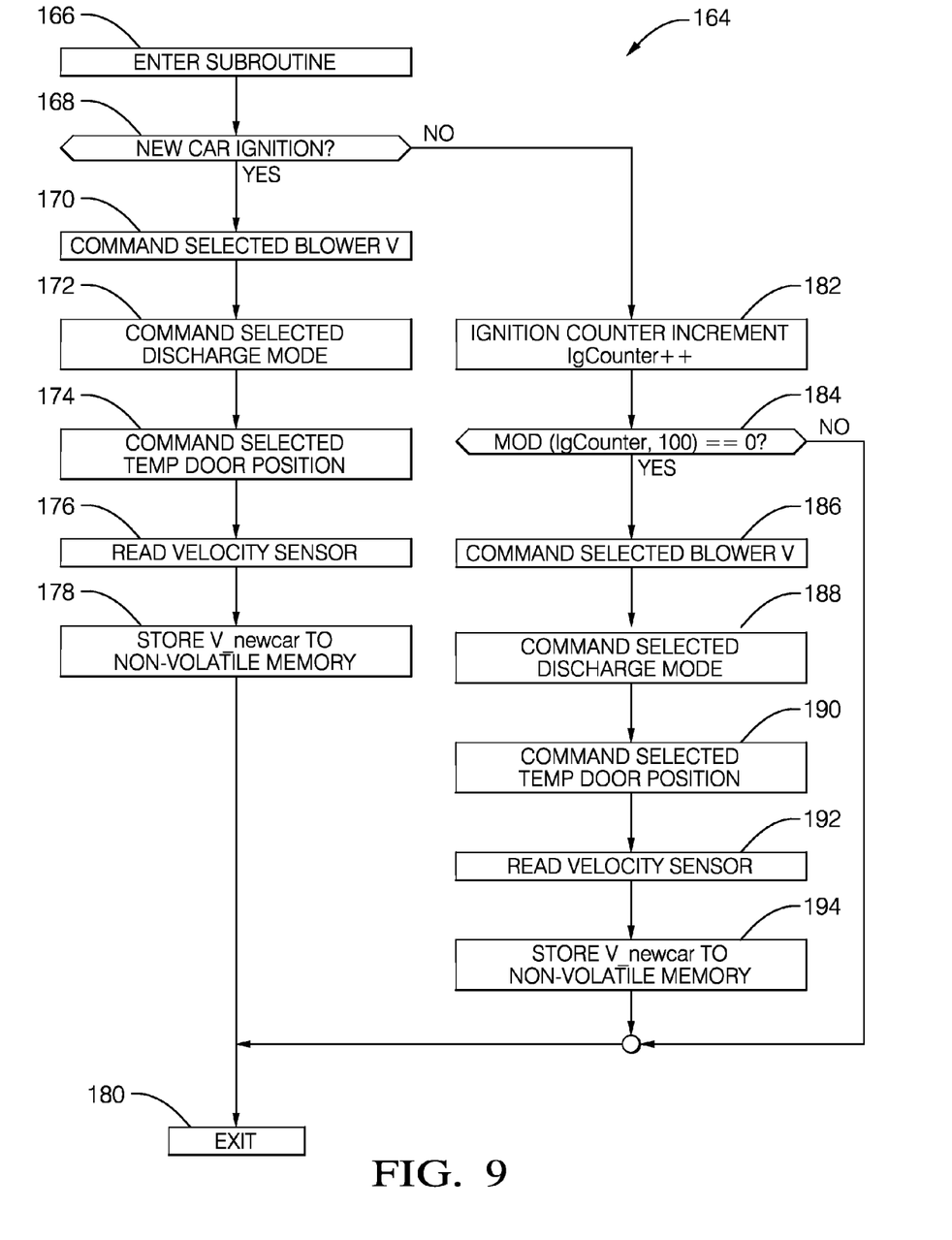
FIG. 9, is a flow chart illustrating the implementation of a velocity sensor management algorithm wherein a non-limiting number of ignition cycles is used to initiate the reading of the sensor in the field.

The velocity sensor 162 is read during the first ignition cycle (preferably during the quality check in the vehicle assembly plant) to establish a baseline airflow velocity when the vehicle is brand new. FIG. 9 illustrates that during the initial baseline access of the velocity sensor, the HVAC module is operated by an algorithm 164 in a selected mode, blower speed, and temperature door position. This initially selected operating condition will be used later in the field so that a consistent basis of comparison is maintained. The value from the velocity sensor is stored in a non-volatile portion of the controller as variable "V_newcar" to be used for future correction of the mathematic model. Algorithm 164 is initiated by entering the subroutine at step 166.

In an initial logic step 168, if the host car is new, a command for selected blower voltage at step 170, followed by a command for selected discharge mode at step 172 and a temperature door position at step 174. Next, the velocity sensor is read at step 176 and the value $V\__{newcar}$ is stored to non-volatile memory at step 178. Lastly, the subroutine 164 is terminated at exit step 180. If the host car is not new, the ignition counter value IgCounter ++ is incremented at step 182 to keep track of ignition cycles. Next, at logic step 184, if MOD(IgCounter, 100) is not equal to zero, the program is immediately terminated at exit step 180. If, however, MOD(IgCounter, 100) is equal to zero (this is the case for every hundred ignition cycles), the program progresses to step 186 wherein a selected blower voltage command is issued, followed by a command for selected discharge mode at step 188 and a command for temperature door position at step 190. Next, the velocity sensor is read at step 192 and value V_newcar is stored to non-volatile memory at step 194. Lastly, the subroutine 164 is terminated at exit step 180.

While operating in the field, a counter is used to keep track of the number of ignition cycles. Even though the velocity sensor can be read continuously, it is preferred to only do so on a periodic basis to minimize disruption to the HVAC system operation as well as the clock cycle resource of the microcontroller. In FIG. 9, the non-limiting number of ignition cycle of 100 is used to initiate the reading of the sensor in the field. Once the specified ignition cycle is reached, the sensor is read and stored in the non-volatile memory as variable "V_current". Along with variable "V_newcar", "V_current" is to be used for correction of the HVAC module predicted zonal flow rate.

Figure 10:
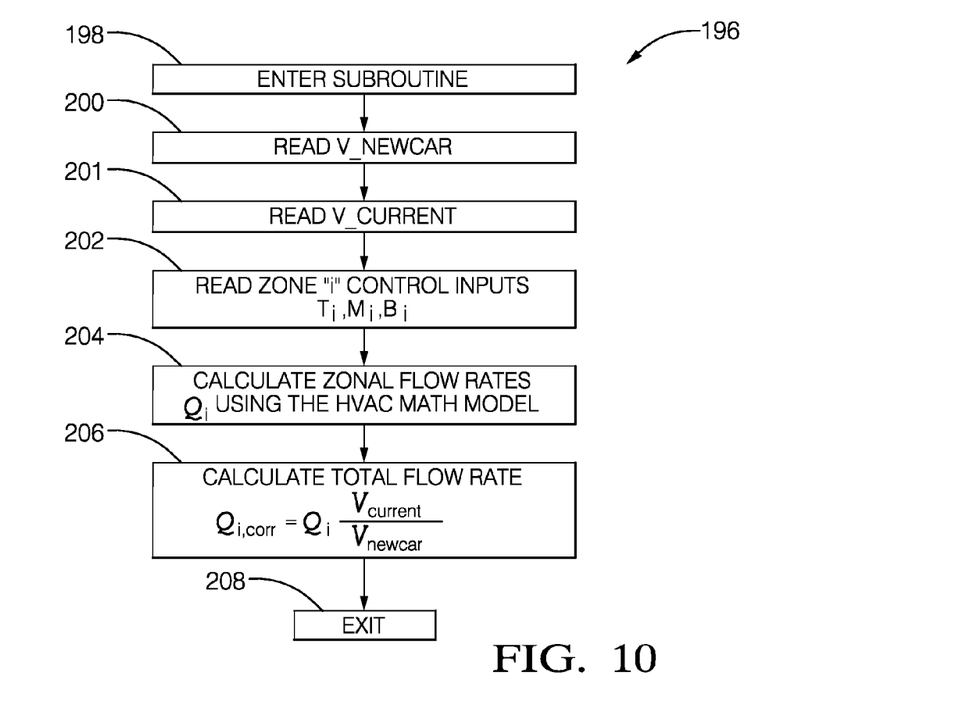
FIG. 10, is a flow chart illustrating the implementation of a HVAC module correction algorithm wherein the variables "V_newcar" and "V_current" are read before the HVAC module mathematic model is run to estimate the model zonal flow rates Qi.

As shown in FIG. 10, the variables "V_newcar" and "V_current" are read before the HVAC module mathematical model is run to estimate the module zonal flow rates $Q_i$. Once the control head desired settings $T_i$, $M_i$, and $Q_i$ are read into the micro controller, the HVAC mathematic model is run to estimate the airflow rate for each zone of the passenger compartment. The HVAC module mathematical model is believed to predict the flow rate for a brand-new module. The predicted flow rate is then scaled down with the ratio of "V_current/V_new" to arrive at flow rates that are more reflective of the actual airflow in the physical module.

Referring to FIG. 10, an algorithm 196 is initiated at a step 198 in which the subroutine is entered, followed by a step 200 of reading V_newcar and a step 201 of reading V_current. Next, at step 202, zone "I" control inputs $T_i$, $M_i$, and $B_i$ are read and employed to calculate zonal flow rates $Q_i$ using the HVAC math model. Subsequently, at step 206, total flow rate is calculated as a $Q_{i,corr} = Q_i V_{current}/V_{newcar}$. Lastly, algorithm 196 is terminated at exit step 208.

Super-Mode Control

As indicated earlier, the High Performance Module employs applicant's "Flexzone" architecture. Each zone of airflow delivery has "Open Airflow Access" to the hot stream going through an "enlarged" heater and an "enlarged" evaporator. The benefit of "Open Airflow Access" is that each zone has full access to the entire airflow through the evaporator and also the entire hot airflow through the heater. It is thus possible to provide "Super HVAC Module Operation Modes" with full power to the HVAC module.

The second enabler is the relatively large heater and evaporator in the High Performance Module. The design specification for the High Performance Module requires that the evaporator and the heater are large enough in heat transfer capacity to provide heating or cooling comfort for a large SUV or Mini-Van with multiple comfort zones. For the Mini-Van, the multi-zones may include the front left, front right, row 2 seats and row 3 seats comfort zones. For a SUV, the multi-zones may include front left, front right, rear left and rear right. Both of these systems may be considered quad-zone systems.

The "Open Airflow Access" and the large evaporator together allow the "Super Modes" to be defined for the front zone of the vehicle. Under certain vehicle conditions, such as windshield defrost, windshield defog, transient heating or transient cooling after ignition, the applicant proposes "Super Defrost", "Super Vent", and "Super Heater" operating modes to enhance HVAC performance.

The "Super Modes" of operation are realized by first shutting off all the rear climate control zones in the vehicle, and by operating the refrigeration and/or heating system at its maximum capacity. This eliminates the amount of heating or cooling consumed by the rear and makes them available to the front passengers. In the high blower settings, since the High Performance Module is designed to provide comfort for the entire vehicle, this "focused" application of heating or cooling to the front passengers enables the "super" performance for the front zone of the vehicle. It is to be recognized that for the majority of the time there are only front passengers in the vehicle. Thus, the "Super Vent" and "Super Heater" modes of operation should frequently and significantly enhance the front passenger comfort, especially during soak and cool-down or soak and warm-up. Meanwhile, the "Super Defrost" mode of operation should tremendously improve the performance of defrosting and defogging, allowing the vehicle to produce improved passenger safety.

Table 1 illustrates the exemplary standard definition of airflow distribution for a quad-zone climate control system. In the normal modes of operation, even if the rear zones are shut off, the maximum airflow allocation to the front zone will not to exceed the amount as allocated in the table. The "normal" modes design conforms to the present day accepted climate control design specification.

TABLE 1

| Airflow Definition for "Normal Mode" Operation | | | | |
|---|---|---|---|---|
| "Normal" | Airflow Distribution (CFM) | | | |
| Operating Mode | Lft/Rgt Deforst Outlet | Lft/Rgt Htr Outlet | Lft/Rgt Vent Outlet | Lft/Rgt Total |
| Defrost | 240 | 30 | 0 | 270 |
| Heater | 30 | 240 | 0 | 270 |
| Vent | 0 | 0 | 300 | 300 |

Table 2 illustrates the exemplary "Super Mode" airflow definition. Due to the extra availability of heating or cooling from the enlarged heater and evaporator for the quad-zone system, there is sufficient HVAC conditioning power to process an increased amount of airflow without compromising the discharge temperatures. Therefore, for each of the "Super Mode" modes of operation, the airflow is increased by approximately 25-30%. With the increased airflow allocation, reduced time to comfort is achieved in the "Super Vent" and "Super Heater" modes, and faster defrost or defog performance is achieved to improve passenger safety.

TABLE 2

Airflow Definition for "Super Mode" Operation

| "Super" | Airflow Distribution (CFM) | | | |
|---|---|---|---|---|
| Operating Mode | Lft/Rgt Deforst Outlet | Lft/Rgt Htr Outlet | Lft/Rgt Vent Outlet | Lft/Rgt Total |
| Max Defrost | 300 | 45 | 0 | 345 |
| Max Heater | 45 | 300 | 0 | 345 |
| Max Vent | 0 | 0 | 400 | 400 |

It is to be noted that the "Super Mode" airflows are not necessarily the maximum airflow that the High Performance Module can deliver at full vehicle power-bus voltage (e.g. 13 VDC). The amount of airflow for a "Super Mode" is carefully selected to optimize the overall passenger thermal comfort experience in the vehicle. The optimization criteria include impact air velocity at the surface of the front passengers, the noise increase associated with the increase of the airflow, dry-eye reduction in the "Super Defrost Mode", etc.

Figure 11:
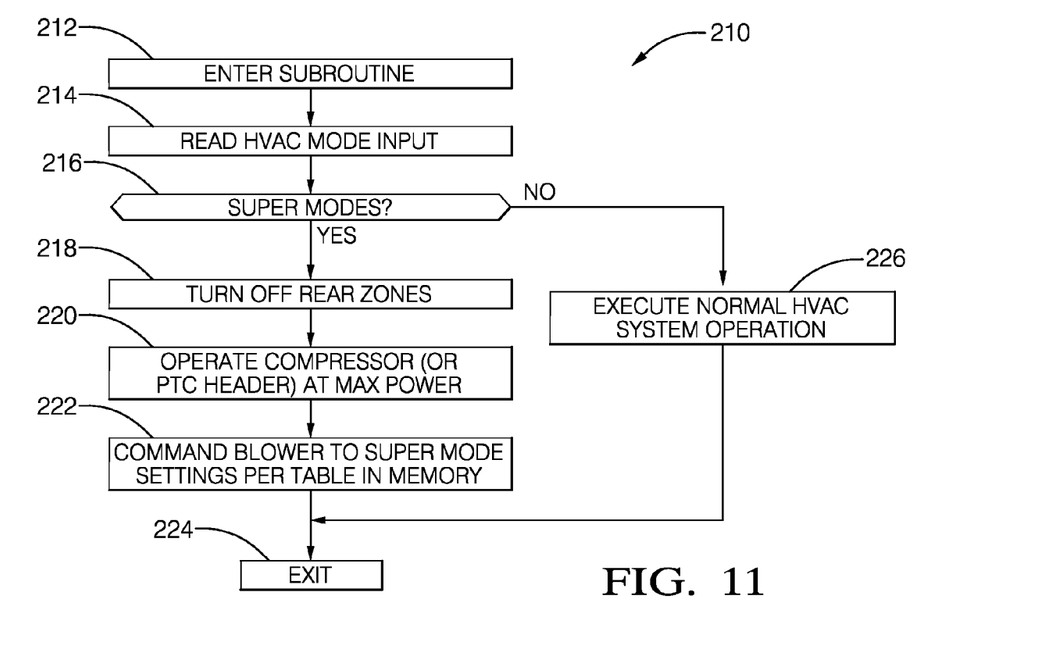
FIG. 11, is a flow chart illustrating the control steps to be taken to achieve "Super Mode" operation.

FIG. 11 illustrates the control steps to be taken to achieve "Super Mode" operation. The first step is to read the control head input and identify if "Super Mode" operation is requested. If so, the rear zones are turned off by shutting off any shut-off valves in the airflow paths to the rear climate control zones. Meanwhile, the compressor is operated at the highest level possible without freezing the evaporator. For example, the electronic variable displacement control for the compressor is set to operate at full stroke. For winter operations, such as the "Super Heater" or "Super Defrost" modes, the PTC heater, if equipped, is powered to the full capacity. Finally, the HVAC blower is set to operation at the appropriate voltage level to provide the specified airflow rate defined for a particular "Super Mode".

FIG. 11 illustrates a control algorithm 210 for achieving Super Mode operation of HVAC module 10. The control algorithm 210 is initiated by entering the subroutine at step 212, followed by the step of reading HVAC mode input at step 214. Following is a logic step 216 wherein if a Super Mode is selected, all rear zones are turned off at step 218. Next, the compressor (or PTC header) is operated at maximum power at step 220. Then, the blower is commanded to operate at Super Mode settings in accordance with a table in memory at step 222. Lastly, the subroutine is exited at step 224. If a Super Mode is not selected at step 216, normal HVAC system operation is executed at step 226 and the subroutine terminated at exit step 224.

While this invention has been described in terms of the preferred embodiments thereof, it is not intended to be so limited, but rather only to the extent set forth in the claims that follow.

It is to be understood that the invention has been described with reference to specific embodiments and variations to provide the features and advantages previously described and that the embodiments are susceptible of modification as will be apparent to those skilled in the art.

Furthermore, it is contemplated that many alternative, common inexpensive materials can be employed to construct the basis constituent components. Accordingly, the forgoing is not to be construed in a limiting sense.

The invention has been described in an illustrative manner, and it is to be understood that the terminology, which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for illustrative purposes and convenience and are not in any way limiting, the invention, which is defined by the following claims as interpreted according to the principles of patent law, including the Doctrine of Equivalents, may be practiced otherwise than is specifically described.

The following documents are deemed to provide a fuller disclosure of the inventions described herein and the manner of making and using same. Accordingly, each of the below-listed documents are hereby incorporated in the specification hereof by reference.

U.S. Pat. No. 7,832,464 B2 to Kinmartin et al. entitled "Flexible Module with Add-On Multi-Zone Sub-Assembly".

U.S. Pat. No. 7,174,918 B2 to Stevenson et al. entitled "Air Flow Control Valve for Vehicle Air Conditioning Module".

U.S. Pat. No. 6,772,822 B2 to Auer et al. entitled "HVAC with Modular Inserts".

U.S. Pat. No. 6,547,152 B1 to Pawlak III entitled "Vehicle Heating Ventilation and Air-Conditioning Module for Improved Heating and Defrosting Performance".

U.S. Pat. No. 6,368,207 B1 to McLaughlin et al. entitled "Automotive Heating, Ventilating and Air Conditioning Module with Improved Air Mixing".

U.S. Pat. No. 5,983,657 to Murata et al. entitled "Air Conditioning System".

U.S. Pat. No. 5,228,475 to Trill entitled "Air Flow Control Valve for a HVAC Module".

Having described the invention, it is claimed:

1. A method of controlling the discharge of temperature-conditioned air into front and rear automobile passenger zones comprising the steps of:
    reading operator requested discharge temperature, discharge blower rate and discharge mode inputs for each automotive heating, ventilating and air conditioning system zone outlet;
    converting each discharge blower request to a requested flowrate;
    calculating a total requested flowrate as a summation of all flowrate requests;
    calculating zonal flowrates employing a predetermined math model;
    calculating a total zonal flowrate as a summation of all zonal flowrates;
    calculating a total blower control error as a function of the difference between said total blower request and said zonal flowrate;
    calculating a blower control error as a function of the difference between said total blower request and said total zonal flowrate;
    modify the blower operating state using the calculated blower control error;
    modify the effective flow areas of said mode valves;
    distribute the effective flow areas of said mode valves into defrost, heater and vent openings; and
    resetting said mode valves as a function of said modification and distribution.

2. The method of claim 1, further comprising the steps of:
determining if a host vehicle is new;
commanding a selected blower voltage value;
commanding a selected discharge mode;
commanding a selected temperature door position;
reading a velocity sensor;
storing a value for blower voltage_newcar to a non-volatile memory;
providing a counter to read and store a value equating to the total number of ignition cycles of a host vehicle;
re-reading said velocity sensor when said counter reaches a predetermined value;
re-storing a new value for blower voltage; and
adjusting said blower voltage as a function of said new value.

3. The method of claim 1, further comprising the steps of:
determining if a host vehicle is new;
reading a velocity sensor;
storing a value for blower velocity_newcar to a non-volatile memory;
reading a current blower velocity;
reading zonal requested discharge temperature, discharge blower rate and discharge mode control inputs;
calculating zonal flowrates using a predetermined HVAC math model; and
calculating total flowrates as a function of total zonal flowrates times the ratio of current blower velocity to blower velocity_newcar.

4. The method of claim 1, further comprising the steps of:
reading a HVAC mode input;
executing normal HVAC system operation if the operator has not set the system in a "super mode";
turning off any rear zones if the operator has set the system in said "super mode";
operating the HVAC compressor or PTC header at maximum power; and
commanding the blower to predetermined "super mode" settings stored in memory.

* * * * *